(12) United States Patent
Guth et al.

(10) Patent No.: US 9,213,682 B1
(45) Date of Patent: Dec. 15, 2015

(54) METHOD AND APPARATUS FOR AUDITING A BUSINESS DOCUMENT

(75) Inventors: David Guth, Matthews, NC (US); Peter J. Lasne, Matthews, NC (US); Andrea B. Magnuson, Salisbury, NC (US); Kellie A. Bickenbach, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 720 days.

(21) Appl. No.: 13/076,778

(22) Filed: Mar. 31, 2011

(51) Int. Cl.
| | | |
|---|---|---|
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |

(52) U.S. Cl.
CPC ................ *G06F 17/2247* (2013.01)

(58) Field of Classification Search
CPC ....... G06F 17/212; G06F 17/21; G06F 17/00; G06F 17/211; G06F 17/30905; G06F 17/24; G06F 17/2247; G06F 17/2725; G06F 17/272
USPC .......................................... 715/273, 249, 237
See application file for complete search history.

(56) References Cited

U.S. PATENT DOCUMENTS

| | | | |
|---|---|---|---|
| 6,453,302 B1* | 9/2002 | Johnson et al. .............. 705/27.2 |
| 7,769,773 B1* | 8/2010 | Doubek et al. ................ 707/769 |
| 2002/0059339 A1* | 5/2002 | McCormick et al. ...... 707/500.1 |
| 2004/0230888 A1* | 11/2004 | Kramer ................. G06F 9/4443 715/201 |
| 2006/0095839 A1* | 5/2006 | Danninger ........ G06F 17/30905 715/248 |
| 2006/0236234 A1* | 10/2006 | Michelstein et al. ......... 715/523 |
| 2008/0077850 A1* | 3/2008 | Gauthier et al. .............. 715/234 |
| 2008/0306894 A1* | 12/2008 | Rajkumar .......... G06Q 10/0637 706/47 |
| 2010/0023471 A1* | 1/2010 | Baldwin et al. ............... 715/234 |
| 2010/0180213 A1* | 7/2010 | Karageorgos et al. ........ 715/753 |
| 2011/0179344 A1* | 7/2011 | Paxson .......................... 715/205 |
| 2012/0192051 A1* | 7/2012 | Rothschiller et al. ......... 715/217 |

* cited by examiner

*Primary Examiner* — Manglesh M Patel
*Assistant Examiner* — Nicholas Hasty
(74) *Attorney, Agent, or Firm* — Weiss & Arons LLP; Michael A. Springs, Esq.

(57) ABSTRACT

A method for creating a conforming business document by auditing is provided. The method may include creating at least one presentation rule. The presentation rules may govern the some or all of the parameters of the elements in a presentation. A business document may be compiled from multiple data sources or existing documents. The existing documents are preferably created within a conforming template but may be non-conforming. A conforming template may follow the presentation rules. Software may be used to construct the business document which may be in the form of slides. The software may be augmented by a plug-in. The plug-in may scan the business document. The plug-in may allow the user to select some or all of the presentation rules that have been broken in an auditing panel. The plug-in may edit the slide so that the slide conforms to the selected presentation rules.

15 Claims, 6 Drawing Sheets

METHOD AND APPARATUS FOR AUDITING A BUSINESS DOCUMENT

FIELD OF TECHNOLOGY

Aspects of this disclosure relate to providing methods and apparatus which audit a business document.

BACKGROUND OF THE INVENTION

A business document may present data from a variety of sources in a comprehensive yet compact form. Different forms of presentation may be used—e.g., slides produced by PowerPoint® software.

One drawback associated with producing documents on a regular basis is a lack of uniformity. Documents may vary due to predilections of the presenter, the source of the data or compatibility between different versions of the software. It would be desirable, therefore, to provide apparatus and methods that provide uniform business documents.

SUMMARY

Systems and methods for presenting and editing presentation slides are preferably provided. The slides may be produced by presentation software. The systems and methods may include a computer. The computer may include a display screen and a keyboard. Often a mouse or other pointing device—e.g., a trackball—is provided as well. The computer may be connected to the Internet. The software may provide one or more views of slides to the user. The software may be augmented by an auditing plug-in.

Although a full-size, or laptop, computer may run the presentation software, other devices are also suitable and included within the scope of the invention—e.g., a PDA, iPhone®, Smartphone, iPad®, Blackberry®, 3G phone, 4G phone or custom hardware.

Although the description of the presentation utilizes PowerPoint® slides as a presentation display, other displays such as charts, spreadsheets and textual reports are contemplated and included within the scope of the invention. For the purposes of this application, the term slide may refer to a portion of any business document. The presentation may be in the form of a business document but other documents—e.g., academic reports—are contemplated and included within the scope of the invention.

The systems and methods according to the invention may receive data from, for example, slides, charts, tables or spreadsheets. The software may further incorporate data into slides from various sources or persons. The data may or may not conform to a known template slide. The plug-in may evaluate the conformance of each slide to a set of presentation rules. Discrepancies between each presentation slide and the template slides may be shown to the user. The user may direct the plug-in to correct some or all of the discrepancies. In some cases, no action will be taken.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for creating, auditing and editing documents—e.g., slides—are provided. A plug-in software module may allow the user to activate one or more presentation rules. Auditing may involve scanning a document for non-compliance with presentation rules. Editing the document may bring the document into compliance with the presentation rules. If the presentation rules are followed, consistent documents may be produced.

Business documents are often created using readily available office software—e.g., Microsoft Word®, Excel® or PowerPoint®. Although some or all of the embodiments in this description refer to PowerPoint® slides, other software or any sort of presentation tool—e.g., Open Office is contemplated and included within the scope of the invention.

One drawback associated with utilizing data from multiple sources is the lack of consistent formatting. Disparate fonts, sizes, etc. create an unwieldy and sometimes uninformative document. Problems may occur when information is transferred between different versions of a software tool, or from different configurations of a tool.

It would be desirable, therefore, to provide apparatus and methods that provide an interactive and intuitive mechanism for creating conforming documents. It would also be advantageous if the mechanism allowed the setting of presentation rules. Lastly, it would be advantageous to have a mechanism that permits the override of presentation rules when necessary.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, flash memory, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

Figure 1:
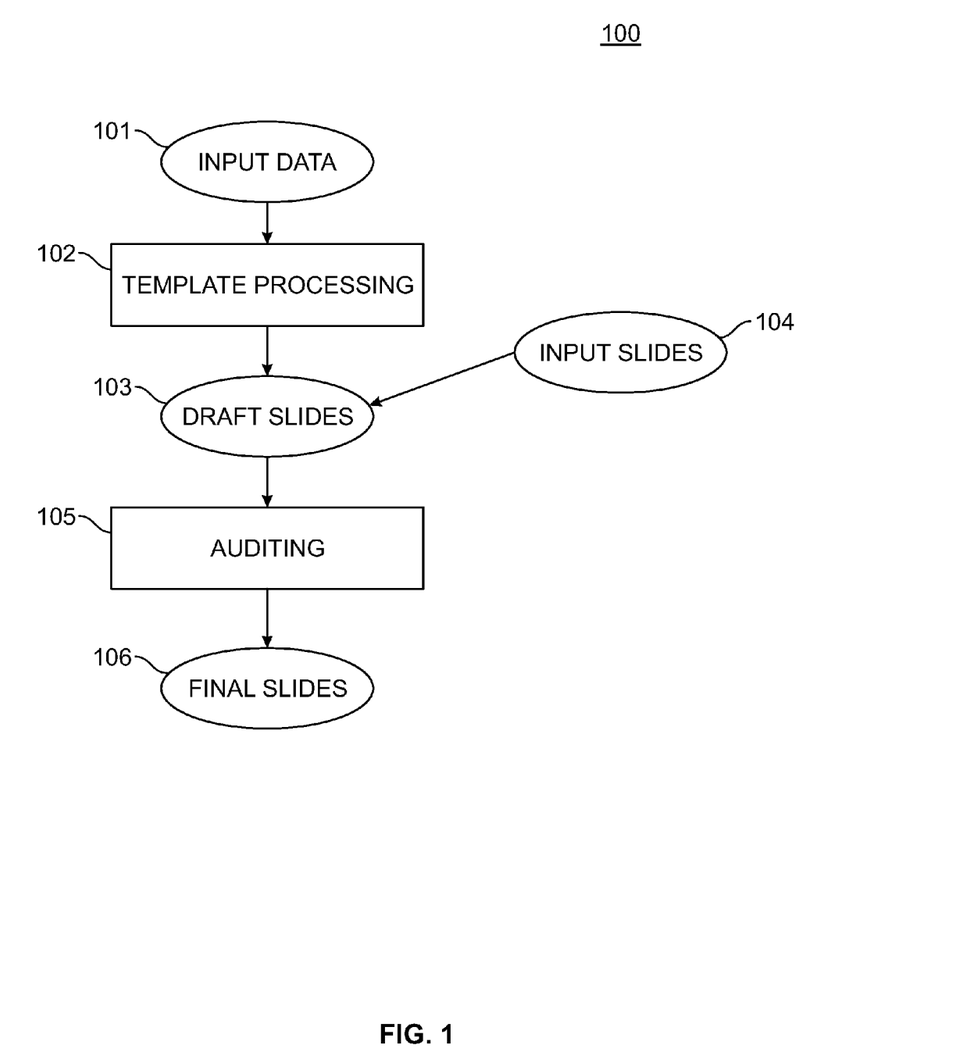
FIG. 1 shows a flow diagram of a system which provides a business document in the form of slides.

FIG. 1 is a diagram of system 100 which creates a business document in the form of slides. System 100 is one possible embodiment of a system for the creation of a business document. The output of system 100 may conform to one or more presentation rules. Input data 101 may come from any suitable source—e.g., a spreadsheet. If the provider of the data chooses, template processing 102 may be applied to the data. Template processing 102 may be configured to follow one or more of the presentation rules. The slides produced after template processing 102 are draft slides 103.

In the alternative input slides 104 may be used to create draft slides 103. Input slides 104 may or may not conform to the presentation rules.

Draft slides 103 are processed by auditing 105. The auditing process first shows the users which presentation rules have not been followed by each draft slide 103. The user may choose to enforce each presentation rule on a slide by slide, and/or a rule by rule, basis. The resulting slides after auditing are final slides 106.

Although the description thus far allows the user to enforce presentation rules on a slide by slide and/or a rule by rule basis, alternative embodiments are contemplated and included within the scope of the invention. As an example, some presentation rules may be enforced by auditing 105 irrespective of the user's wishes. Some presentation rules may be enforced substantially universally depending on the enforcement of another rule or rules. Still other rules may be enforced substantially universally across every slide, across some of the slides or none of the slides. These examples and any other suitable rule usage are contemplated and included within the scope of the invention.

Figure 2:
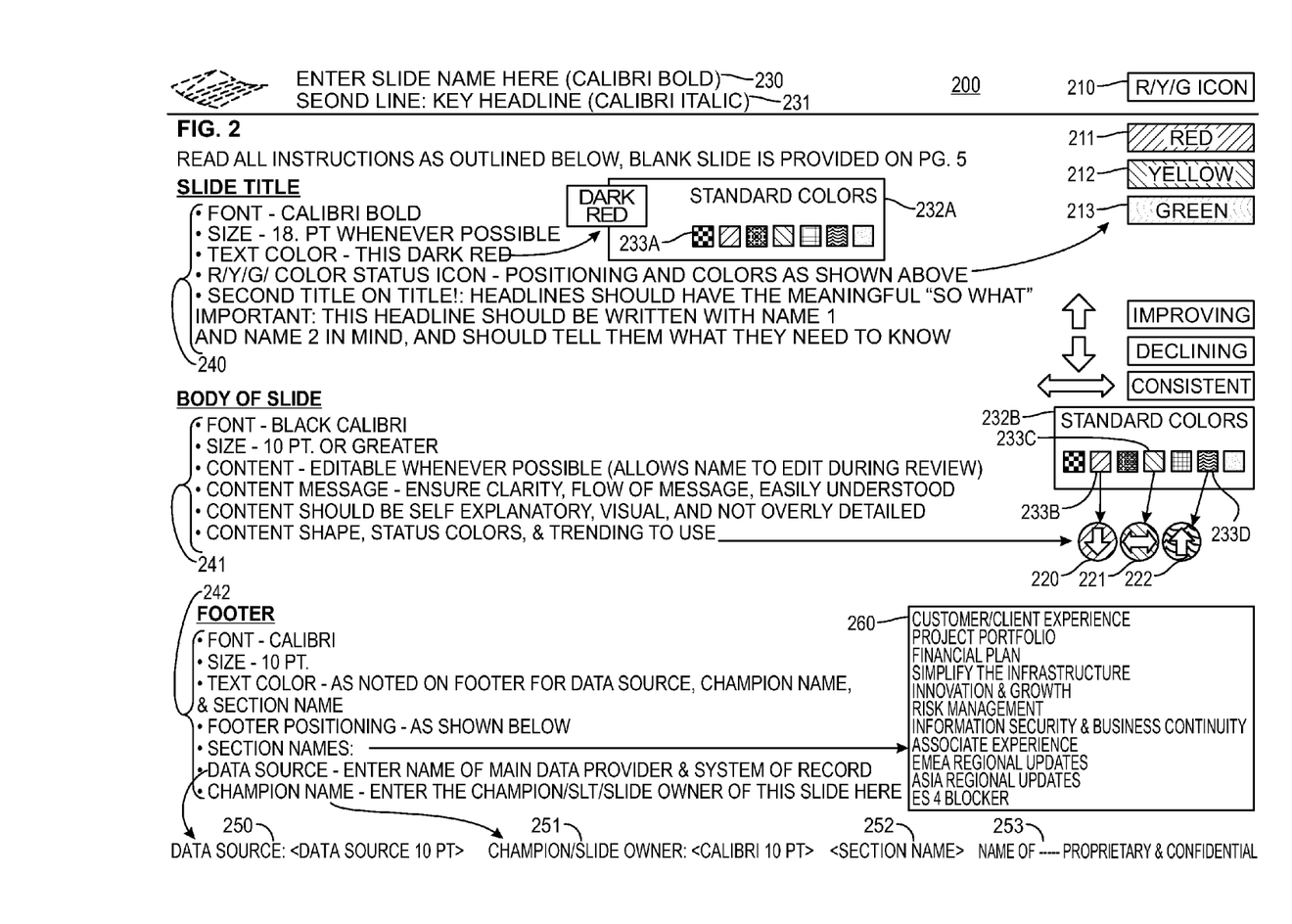
FIG. 2 shows an example set of presentation rules for the formatting of a slide in a business document.

FIG. 2 shows an example template description slide 200. Template description slide 200 also conforms to the described template. This slide and the remaining slides in this description utilize PowerPoint® slides, PowerPoint® menus and PowerPoint® nomenclature. As described above the use of PowerPoint® nomenclature is exemplary and other presentation tools and presentation paradigms are within the scope of the present invention.

Placed in the upper right hand corner is a colored status bar element 210. Colored status bar 210 may be a red bar 211, a green bar 212 or a yellow bar 213.

Placed at the top of the slide is a slide name element 230, which may be presented in Calibri font with bold text. Under the slide name 230 is a key headline element 231 which may be presented in Calibri font with italic text. All of the font may be colored dark red, 233A.

In addition to the status bar, trend arrow icons 220, 221 and 223 are also used. A standard color menu 232B is used to color the icons. The standard color menu, 232B includes the colors red 233B, yellow 233C and green 233D and other colors. In this example the downward trending icon 220 is colored red, the neutral icon 221 is colored yellow and the upward trending icon 222 is colored green.

The presentation rules may include rules for the elements of the slide title (and similar objects)—i.e., the slide name 230, key headline 231 and the colored status icon 210.

On the left side of the slide are bullet points. Included within the bullet points 240 is another standard color menu 232A. The standard color menu 232A includes a color, dark red 233A, which is the color for text in slide name 230 and key headline 231.

Bullet points 241 may provide presentation rules for elements in the body of the slide. These rules include the font, the font size, the trending icons 220, 221 and 222 as well as any other suitable parameters associated with the slide body.

Bullet points 242 may also provide presentation rules for the elements of the slide footer 270. The presentation rules may include the font, the font size, the text color as well as any other suitable parameters associated with the slide footer.

The slide footer 270 may include a data source 250, a champion/slide owner 251, a section name 252 and a company identification/confidentiality level 253.

Even though particular colors and arrows are shown in the example slide 200, other colors and indicators—e.g., thumbs up, thumbs down symbol—are contemplated and included within the scope of the invention.

Figure 3:
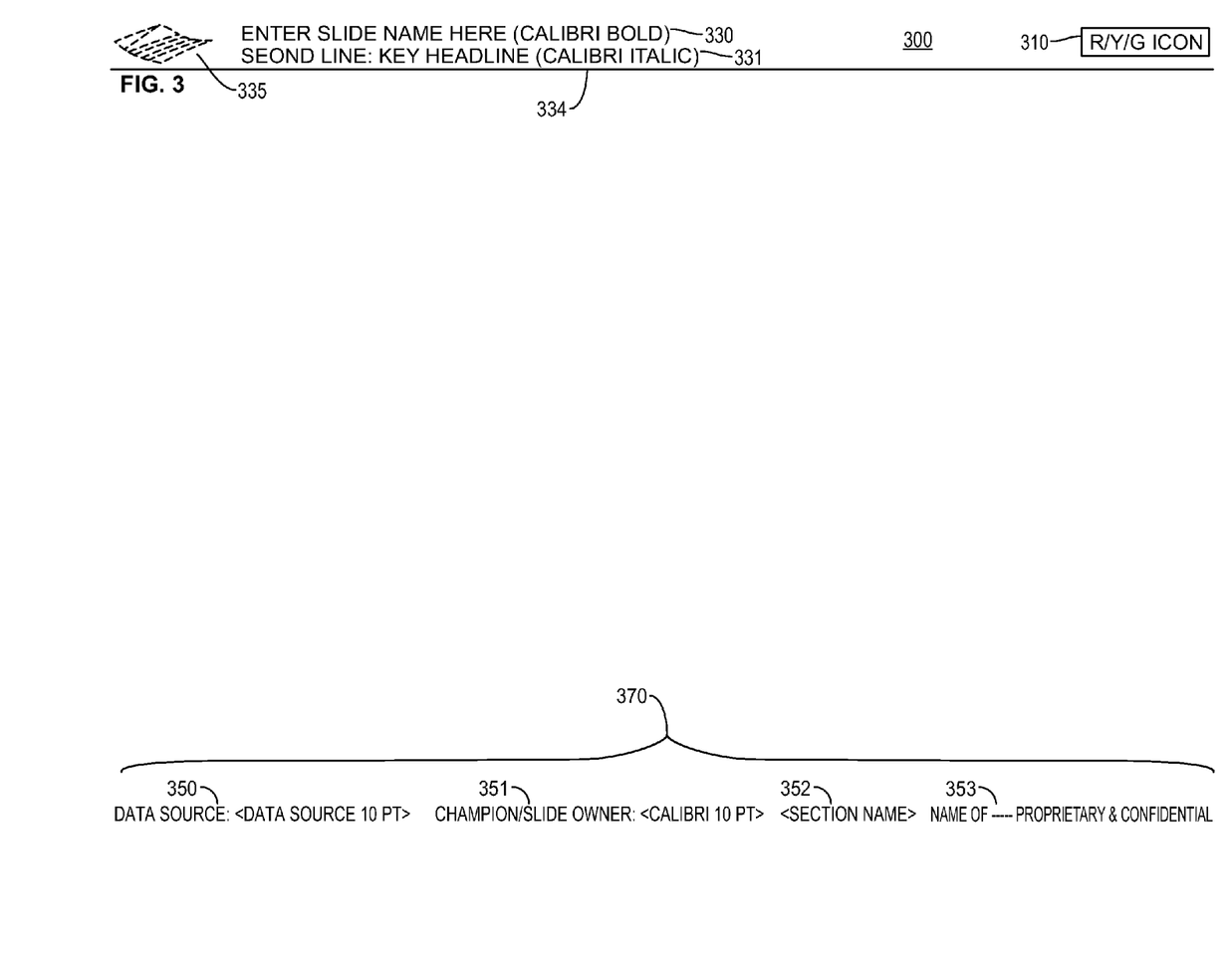
FIG. 3 shows an example template slide for the formatting of a slide in a business document.

FIG. 3 shows an example slide 300 that serves as a blank template. Users may be able to create content within the template 300. Content created within such a template may more readily conform to applicable presentation rules.

Placed at the top of the slide is a slide name 330, which may be presented in Calibri font with bold text. Under the slide name 330 is a key headline 331 which may be presented in Calibri font with italic text. Under the key headline 331 is a rule line 334. Placed in the upper left hand corner is a corporate icon 335. Placed in the upper right hand corner is a colored status bar 334. As shown above with relation to example slide 200, the nature of the colored status bar 334 may be selectable—i.e., either red, yellow or green. Such colors may correspond to an exemplary presentation rule.

The slide 300 may have a footer 370 which may include a data source 350, a champion/slide owner 351, a section name 352 and a company identification/confidentiality level 353.

Figure 4:
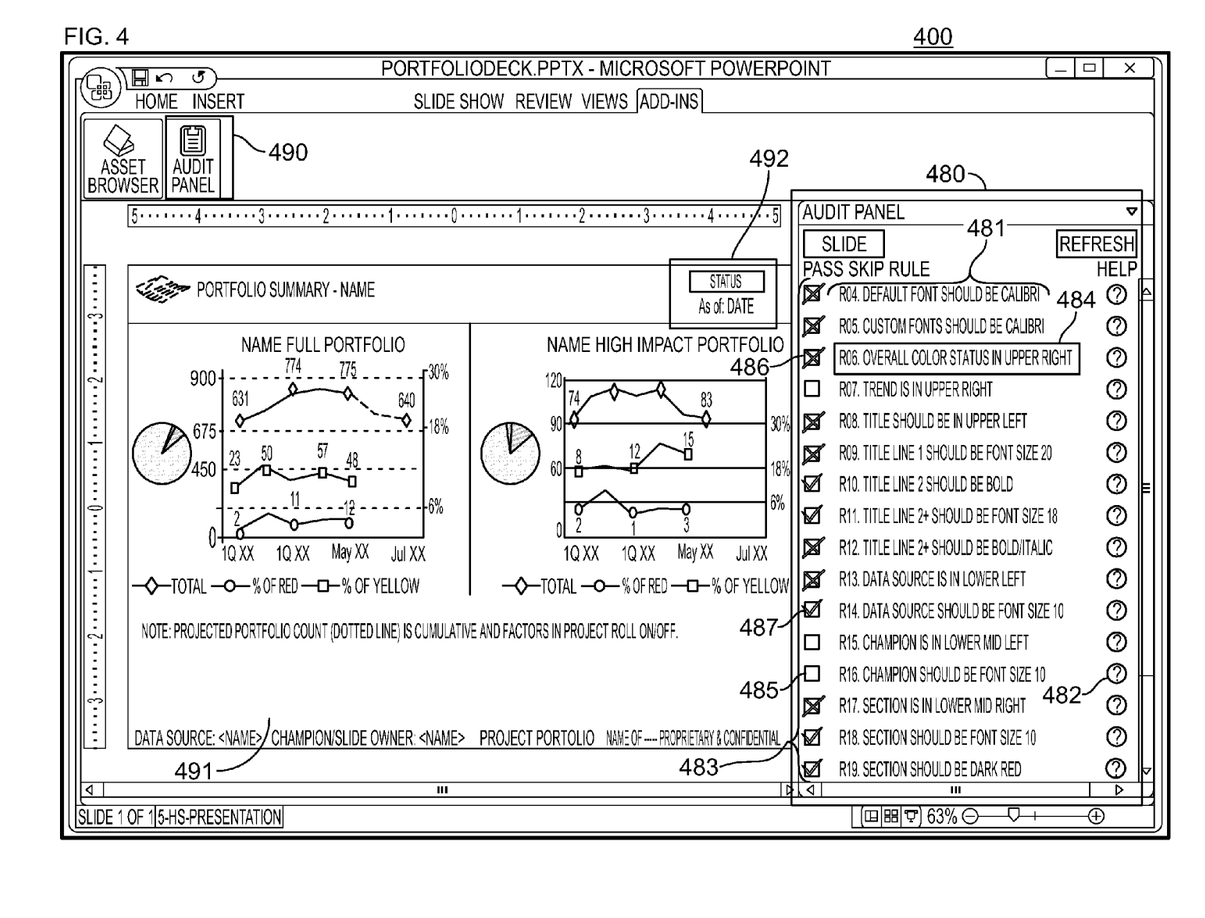
FIG. 4 shows a audit panel for a plug-in, where the plug-in allows the implementation of presentation rules.

FIG. 4 shows a user interface 400 that allows a user to apply presentation rules to a slide 491. User interface 400 is a PowerPoint® interface showing a typical "ribbon" menu which includes a plug-in icon for auditing 490. The plug-in icon 490 activates the audit panel 480. Audit panel 480 may contain a list of presentation rules 481, a list of help icons 482 and a list of checkboxes 483.

The checkboxes may be empty, meaning compliant,—e.g., checkbox 485—an "x", meaning non-compliant—e.g., checkbox 456—or a "check", meaning repaired—e.g., checkbox 487. An empty checkbox means that the particular presentation rule—e.g., Champion is lower-mid-left—has been followed or is not relevant to the slide. A checkbox with an "x" indicates a presentation rule has not been followed—e.g. presentation rule 484, r06 Overall Color Status is in upper-right.

If the presentation rule has not been followed the user my click on the checkbox with the "x" and activate that presentation rule. If the presentation rule is activated, the plug-in software may edit the slide to conform to that presentation rule. If the editing is successful then the checkbox will have a "checked" status—e.g., checkbox 487.

Prior to the use of the audit plug-in a set of presentation rules may be created. The presentation rules are preferably stored as parameters for slide elements, but other representations of presentation rules are contemplated and included within the scope of the invention. The nature of the parameters depends on the type of presentation software and nature of the presentation rules. Typical parameters may include required/not required, conditions for making an element required, size, color, font, position and any other suitable presentation parameter.

Example parameters for elements are described in Table 1 below. Some elements such as the rule line 334 are required on every slide. Other elements such as the colored status bar 210 are required on some types of slides but not on others. The rule line can be described by the following parameters:

color of the line
thickness of line
position of the first endpoint and "type"—e.g. an arrowhead
position and type of the second endpoint
the rule is preferably required on every slide

TABLE 1

| Elements | Parameters |
| --- | --- |
| Rule line | Color, thickness, first-endpoint (x, y, type), second-endpoint (x, y, type), , REQUIRED |
| Colored status bar | Border-color, fill-color, position (x, y), size (x, y), text-properties, REQUIRED (condition) |
| headline text | Font, color, size, style, position (x, y), no-border, no-fill, REQUIRED |

Complex rules, such as conditional rules, are contemplated and included within the scope of the invention—e.g., if a slide contains a summary, the slide must also include a colored status bar. Other presentation rules may disallow certain elements, words or colors anywhere in the slide or only on certain types of slides—e.g., title slides.

In certain embodiments of the invention, overall style rules governing the slides may be implemented as well, as shown in the following examples.

1. Word count rules, limiting the total number of words in a bullet point or on a slide.
2. Line count rules, limiting the number of lines on a slide.
3. Color rules, limiting the palette of colors used.
4. Density rules, limiting the amount of non-white space on a slide—i.e., limiting slide crowding.

When the plug-in is first activated, the software may scan the slide and compare the parameters of each element against the stored parameters derived from the presentation rules. The plug-in is preferably aware of the nature and the content of each slide—e.g., a bullet slide summarizing an account status. The slide may be stored in any number of formats—e.g., text, binary, XML or any other suitable format. In all cases the plug-in software may be able to scan and edit the slide file.

The audit panel 480 may be presented to the user. Each presentation rule for the slide is presented in list 481. The status—e.g., empty or "x"—is presented to the user. The user may inquire about the nature of a particular presentation rule by clicking on a corresponding help icon. The user may also use the audit plug-in to edit a slide so that it conforms to a particular presentation rule—e.g., rule r06—by clicking on the corresponding check box. If the editing is successful then the checkbox may have a "checked" status—e.g., checkbox 487. If the editing is unsuccessful, an error message (not shown) may be shown to the user.

Editing of the slide by the plug-in may be accomplished by either activating a "macro" containing commands which are run within the presentation software or by altering the slide file. After a rule has been applied to the slide 491, the display of the slide 491 may be refreshed so that the user can view the result of the editing. If the results are unsuitable, the user may be able to reverse the edit and the corresponding checkbox will again have an "x". Alternatively, the slide may substantially immediately refresh following editing, and then be immediately displayed.

Any number of interface methods may be used for audit panel 480 including but not limited to drop down menus, radio buttons or any suitable methods and are included within the scope of the invention.

Figure 5A:
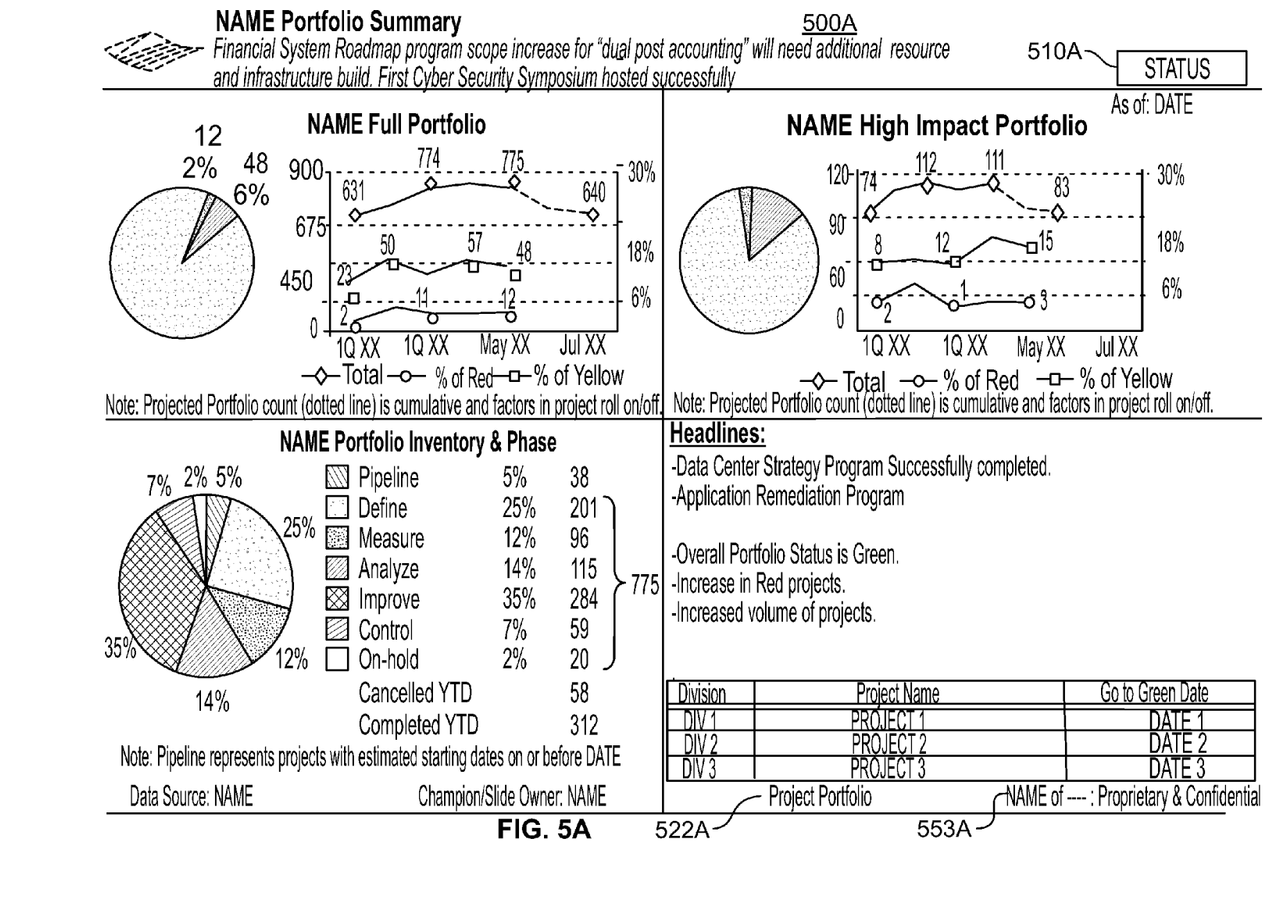
FIG. 5A shows an exemplary slide where some presentation rules have been broken.

FIG. 5A shows an exemplary slide 500A where some exemplary presentation rules have been broken. Slide 500A mostly conforms to the example slide 300. However, element 510A, the colored status bar, is not in the correct position—i.e., it is too low on the page. Further, footer elements 552A and 553A are too low on the page. Thus, three presentation rules have been broken on this slide.

Figure 5B:
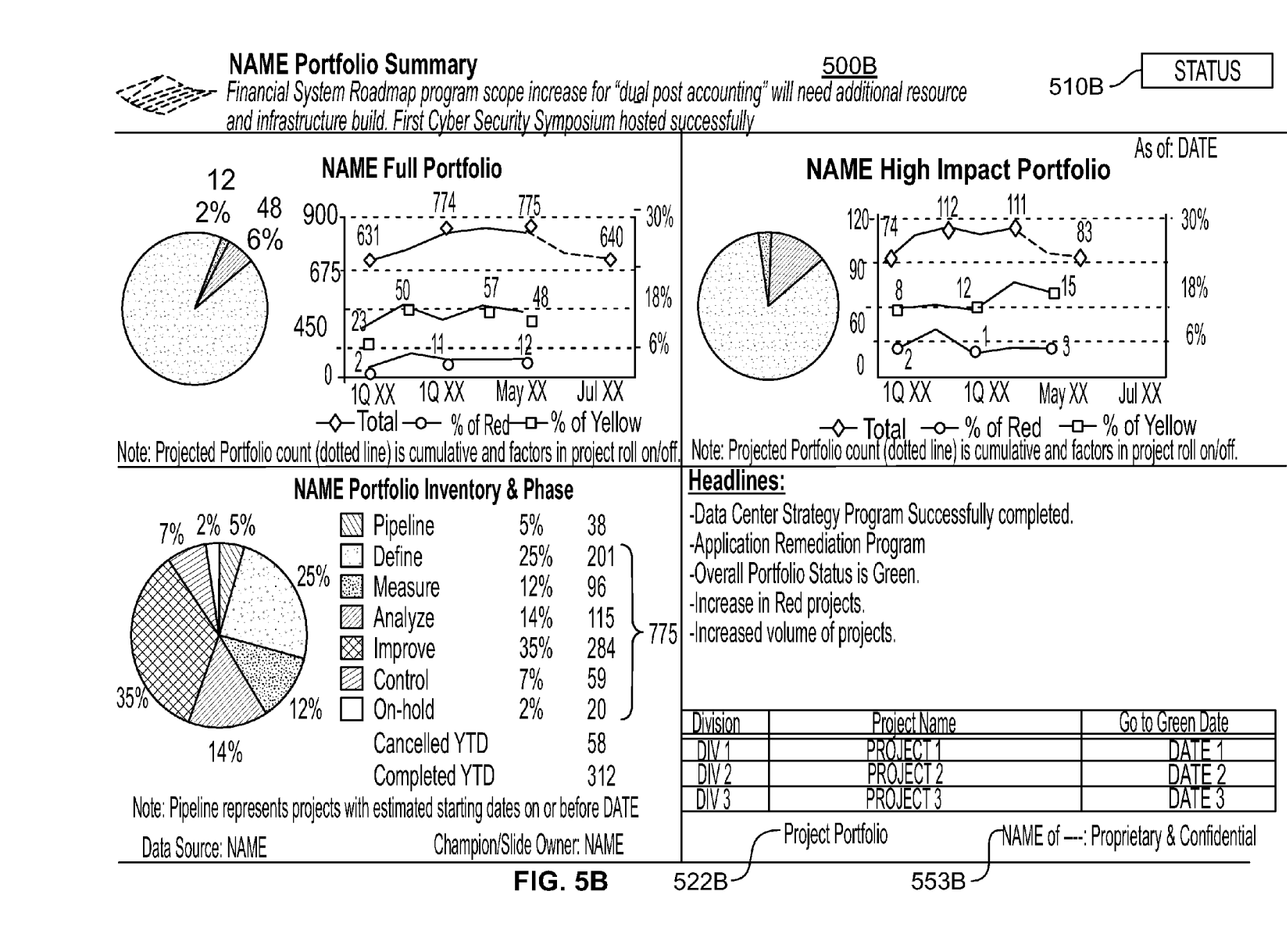
FIG. 5B shows the exemplary slide of FIG. 5A, which conforms to the presentation rules.

FIG. 5B shows the exemplary slide of FIG. 5A, which now conforms to the presentation rules. Element 510B, is in the correct location. Footer elements 552A and 553A are also in the correct location.

Some slides may not conform in any way to the example slide 300. Many presentation rules may be broken by such a slide. First, the template may be incorrect so corporate icon 335 and rule line 334 may be missing. Likewise, the slide name may not be dark red Calibri font with bold text. A colored status bar may be missing, although a slide of this type may require it. Also, all of the footer elements may be missing. An amended slide would correct some or all of these errors as described with regard to example slide 500A

Thus, an apparatus that audits slides in accordance with presentation rules has been provided. Persons skilled in the art will appreciate that the present invention can be practiced by other than the described embodiments, which are presented for purposes of illustration rather than of limitation, and that the present invention is limited only by the claims that follow.

What is claimed is:

1. A business document auditing device comprising:
   a receiver configured to receive:
      a set of universal presentation rules comprising one or more parameters, said universal presentation rules configured to override all other presentation rules, wherein said universal presentation rules are enforced, irrespective of a user's wishes, across substantially every business document of the user, wherein the universal presentation rules comprise:
         page word count rules which limit the total word count on each page of each business document of the user;
         bullet point word count rules which limit the total word count on each bullet point included on each business document of the user;
         line count rules which limit the total number of lines on each page of each business document of the user;
         color rules which limit the palette of colors used on each page of each business document of the user; and
         density rules which limit the amount of white space on each page of each business document of the user; and
      a set of customized presentation rules comprising one or more parameters, said customized presentation rules customized by the user, wherein said customized presentation rules allow the user to enforce the customized presentation rules on a single business document, wherein the customized presentation rules are included on a displayable audit panel, wherein the displayable audit panel is viewable adjacent to the business document;
   a memory configured to store:
      execution instructions;
      one or more business documents;
      the set of universal presentation rules; and
      the set of customized presentation rules; and
   a processor coupled with the memory, the processor configured to execute the instructions, the instructions configured to cause the processor to:

compare a parameter of an element of a business document of the one or more business documents to a first parameter of the universal presentation rules, wherein, when the parameter of the element of the business document is a non-compliant parameter, the processor is further configured to conform the element of the business document to the first parameter of the universal presentation rules; and compare the universal presentation rules to the customized presentation rules, wherein:

when the universal presentation rules are in conflict with the customized presentation rules, the processor is further configured to cause the universal presentation rules to override the customized presentation rules; and when the universal presentation rules are not in conflict with the customized presentation rules, the processor is further configured to:

compare the parameter of the element of the business document to a second parameter of the customized presentation rules, and cause the processor to, when the parameter of the element of the business document is a non-compliant parameter, present an option to the user to conform the element of the business document to the second parameter of the customized presentation rules.

2. The device of claim 1, wherein, when the universal presentation rules are not in conflict with the customized presentation rules, the receiver is further configured to receive, from the user, an instruction to conform the element of the business document to the second parameter of the customized presentation rules.

3. The device of claim 1 further comprising:

when the universal presentation rules are not in conflict with the customer presentation rules, the receiver further configured to receive, from the user, an instruction not to conform the element of the business document to the second parameter of the customized presentation rules.

4. The device of claim 1 wherein, when the customized presentation rules are a first set of customized presentation rules the device further comprises:

the receiver further configured to receive a second set of customized presentation rules; and the processor further configured to conform the element of the business document to the second set of customized presentation rules.

5. The device of claim 1 further comprising:

the receiver further configured to receive, when the universal presentation rules are not in conflict with the customer presentation rules, from the user, an instruction to conform at least a portion of the element of the business document to the second parameter of the customized presentation rules.

6. The device of claim 5 further comprising changing the set of customized presentation rules within a file.

7. The device of claim 1 wherein the instructions are further configured to cause the processor to scan the business document for elements that do not conform to the set of customized presentation rules.

8. A method for auditing a business document comprising:

providing a slide;

providing:

a set of universal presentation rules comprising one or more parameters, said universal presentation rules configured to override all other presentation rules, wherein said universal presentation rules are enforced, irrespective of a user's wishes, across substantially every one of a user's one or more slides, wherein the universal presentation rules comprise:

page word count rules which limit the total word count on each slide of the user;

bullet point word count rules which limit the total word count on each bullet point included on each slide of the user;

line count rules which limit the total number of lines on each slide of the user;

color rules which limit the palette of colors used on each slide of the user; and density rules which limit the amount of white space on each slide of the user; and a set of customized presentation rules comprising one or more parameters, said customized presentation rules customized by the user, wherein said customized presentation rules allow the user to enforce the customized presentation rules on a single slide, wherein the customized presentation rules are included on a displayable audit panel, wherein the displayable audit panel is viewable adjacent to the slide;

comparing a parameter of an element of the slide to a first parameter of the universal presentation rules; and conforming, when the parameter of the element of the slide is a non-compliant parameter, the element of the slide to the first parameter of the universal presentation rules; and comparing the universal presentation rules to the customized presentation rules, said comparing comprising:

when the universal presentation rules are in conflict with the customized presentation rules, causing the universal presentation rules to override the customized presentation rules; and when the universal presentation rules are not in conflict with the customized presentation rules, comparing the parameter of the element of the slide to a second parameter of the customized presentation rules, wherein, when the parameter of the element of the slide is a non-compliant parameter, presenting to the user an option to conform the element of the slide to the second parameter of the customized presentation rules.

9. The method of claim 8, wherein, when the universal presentation rules are not in conflict with the customized presentation rules, the method further comprises receiving from the user an instruction to conform an element of the slide to the second parameter of the customized presentation rules.

10. The method of claim 8 further comprising, when the universal presentation rules are not in conflict with the customer presentation rules, receiving, from the user, an instruction not to conform the element of the slide to the second parameter of the customized presentation rules.

11. The method of claim 8, wherein, when the customized presentation rules are a first set of customized presentation rules, the method further comprises:

receiving a second set of customized presentation rules; and conforming the element of the slide to the second set of customized presentation rules.

12. The method of claim 8 further comprising:

receiving from the user when the universal presentation rules are not in conflict with the customer presentation rules, an instruction to conform at least a portion of the element of the slide to the second parameter of the customized presentation rules.

13. The method of claim 8 further comprising changing the set of customized presentation rules within a file.

14. The method of claim 9 further comprising scanning the slide for elements that do not conform to the set of customized presentation rules.

15. A method for auditing a business document comprising:

providing:

a set of universal presentation rules comprising one or more parameters, said universal presentation rules configured to override all other presentation rules, wherein said universal presentation rules are enforced, irrespective of a user's wishes, across substantially every one of a user's one or more slides, wherein the universal presentation rules comprise:

page word count rules which limit the total word count on each slide of the user;

bullet point word count rules which limit the total word count on each bullet point included on each slide of the user;

line count rules which limit the total number of lines on each slide of the user;

color rules which limit the palette of colors used on each slide of the user; and density rules which limit the amount of white space on each slide of the user; and a set of customized presentation rules comprising one or more parameters, said customized presentation rules customized by the user, wherein said customized presentation rules allow the user to enforce the rules on a single slide, wherein the customized presentation rules are included on a displayable audit panel, wherein the displayable audit panel is viewable adjacent to the slide;

comparing a parameter of an element of the slide to a first parameter of the universal presentation rules; and conforming, when the parameter of the element of the slide is a non-compliant parameter, the element of the slide to the first parameter of the universal presentation rules; and comparing the universal presentation rules to the customized presentation rules, said comparing comprising:

when the universal presentation rules are in conflict with the customized presentation rules, causing the universal presentation rules to override the customized presentation rules; and when the universal presentation rules are not in conflict with the customized presentation rules and the parameter of the element of the slide is a non-compliant parameter, presenting, to a user, a menu of selectable presentation rules from the set of customized presentation rules, said selectable rules, upon selection by the user, configured to conform the element of the slide to a second parameter of the customized presentation rules.

\* \* \* \* \*